US005951673A

United States Patent [19]

Miyata

[11] Patent Number: 5,951,673

[45] **Date of Patent: *Sep. 14, 1999**

[54] DIGITAL SIGNAL PROCESSING DEVICE CAPABLE OF SELECTIVELY IMPARTING EFFECTS TO INPUT DATA

[75] Inventor: Tomomi Miyata, Hamamatsu, Japan

[73] Assignee: Yamaha Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/376,407

[22] Filed: Jan. 23, 1995

[30] Foreign Application Priority Data

Jan. 25, 1994 [JP] Japan .................................... 6-023131

[51] Int. Cl.[6] ............................ G06F 13/60; G10H 1/06; G01P 3/60

[52] U.S. Cl. ................................ 712/36; 712/37; 84/626; 84/732

[58] Field of Search .................................... 395/800, 375, 395/800.42, 800.37, 800.36; 364/736; 84/630, 602, 626, 662, 627, 737; 381/63, 61, 62; 712/36, 37

[56] References Cited

U.S. PATENT DOCUMENTS

| | | | |
|---|---|---|---|
| 4,890,225 | 12/1989 | Ellis, Jr. et al. | 395/375 |
| 5,297,071 | 3/1994 | Sugino | 364/736 |
| 5,339,416 | 8/1994 | Nakagami et al. | 395/650 |
| 5,365,467 | 11/1994 | Fujita et al. | 364/723 |
| 5,459,843 | 10/1995 | Davis et al. | 395/375 |
| 5,517,436 | 5/1996 | Andreas et al. | 364/736 |

FOREIGN PATENT DOCUMENTS

| | | |
|---|---|---|
| 56-67453 | 11/1979 | Japan . |
| 62-20032 | 7/1985 | Japan . |
| 62-44835 | 8/1985 | Japan . |
| 62-147531 | 12/1985 | Japan . |
| 61-20892 | 5/1986 | Japan . |
| 5-150977 | 9/1991 | Japan . |
| 5-108341 | 10/1991 | Japan . |
| 5-181668 | 12/1991 | Japan . |

OTHER PUBLICATIONS

AR "Microprocessor, Microprogram And Control Device" Shoda and Kida; Electronics Science Series–77, Apr. 10, 1978.

*Primary Examiner*—Larry D. Donaghue
*Attorney, Agent, or Firm*—Graham & James LLP

[57] ABSTRACT

A digital signal processing device (e.g., DSP), employed by electronic musical instruments and the like, is designed to perform a variety of digital signal processings. The digital signal processing device contains an arithmetic unit which is configured by at least an adder and a multiplier. There are provided first and second microprograms, each of which consists of microinstructions and each of which is designed to perform a specific kind of digital signal processing. The first and second microprograms are alternatively selected in accordance with a preset sequence of processing; and consequently, data supplied to the arithmetic unit are changed in response to the microprogram selected. Thus, the arithmetic unit performs arithmetical operations, using the data selectively supplied thereto, in accordance with the microprogram selected. By changing the sequence of processing, it is possible to easily change a manner of digital computing performed by the digital signal processing device. For example, the first and second microprograms are executed successively in a serial manner or are executed simultaneously in a parallel manner. Preferably, the first microprogram is designed to impart distortion to the data, while the second microprogram is designed to impart reverberation to the data.

8 Claims, 10 Drawing Sheets

DIGITAL SIGNAL PROCESSING DEVICE CAPABLE OF SELECTIVELY IMPARTING EFFECTS TO INPUT DATA

BACKGROUND OF THE INVENTION

1. Field of the Invention

The present invention relates to a digital signal processing device which performs a variety of digital signal processings.

2. Prior Art

As the conventional digital signal processing devices, the digital signal processor (i.e., DSP) is known. The DSP is advantageous in performing a variety of digital signal processings at high speed. Normally, the DSP contains an arithmetic unit which performs arithmetical operations such as addition and multiplication. As compared to other portions of the DSP, the arithmetic unit is disadvantageous in that the processing speed, particularly the processing speed of the multiplier, is relatively slow. In order to cope with the disadvantage, the pipeline processing is employed to perform the operations.

However, employment of the pipeline processing results in the restriction to the programming for the conventional DSP which uses a plenty of microprograms. In general, the execution speed of the multiplier provided in the arithmetic unit is lower than the execution speed to perform one step of the microprogram; in other words, a certain amount of execution time, which is larger than an execution time required for executing one step of the microprogram, is required to yield a result of multiplication. This means that the result of multiplication cannot be used immediately in the step next to the step which achieves the multiplication instruction. In short, the conventional DSP is disadvantageous in that the processing cannot be performed continuously.

Now, assuming the case where an arithmetical operation for an equation "a×b×c" is performed under the condition where two steps are required to yield the result of multiplication, for example. In that case, if the multiplication of "a×b" is performed in first step, a result of that multiplication can be obtained not in second step but in third step. Therefore, the next multiplication using the number 'c' should be performed on the result of the multiplication of "a×b", which is retained in a register, in third step or later. For this reason, the second step is useless in terms of the execution of the above arithmetical operation; actually however, the second step can be used for executing another instruction. Since the arithmetic unit, containing the multiplier, employs the pipeline processing, the multiplication instruction can be provided for the second step.

As described above, the conventional DSP suffers from a problem that the programming for the microprogram cannot be made continuously. If the DSP uses a high-speed multiplier which is capable of performing the multiplication within one step, the above problem may be eliminated. However, such multiplier is very expensive in cost. In addition, the above problem can be solved by reducing the number of steps of the microprogram which are carried out in one sampling period. However, this will deteriorate the performability of the DSP because in general, the performability of the DSP is improved by increasing the number of steps of the microprogram to be carried out in one sampling period.

When creating the microprogram for the conventional DSP, the designer should create it by paying attention to the timings to yield the results of multiplication. So, codes of different operations should emerge in turn in the microprogram. This badly affects the readability for the microprogram. In short, it takes much time in debugging the microprogram.

SUMMARY OF THE INVENTION

It is an object of the present invention to provide a digital signal processing device which can offer a good readability for the microprogram.

The present invention generally relates to the digital signal processing device and particularly to the DSP whose arithmetic unit can be used efficiently. More particularly, the present invention relates to improvements in creating the microprogram.

According to the present invention, the digital signal processing device contains an arithmetic unit which is configured by at least an adder and a multiplier. There are provided first and second microprograms, each of which consists of microinstructions and each of which is designed to perform a specific kind of digital signal processing. The first and second microprograms are alternatively selected in accordance with a preset sequence of processing; and consequently, data supplied to the arithmetic unit are changed in response to the microprogram selected. Thus, the arithmetic unit performs arithmetical operations, using the data selectively supplied thereto, in accordance with the microprogram selected. By changing the sequence of processing, it is possible to change a manner of digital computing performed the digital signal processing device. For example, the first and second microprograms are executed successively in a serial manner or are executed simultaneously in a parallel manner. Preferably, the first microprogram is designed to impart distortion to the data, while the second microprogram is designed to impart reverberation to the data.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENTS

Now, the preferred embodiments of the present invention will be described in detail with reference to the drawings, wherein parts equivalent to those in some drawings will be designated by the same numerals.

Figure 1:
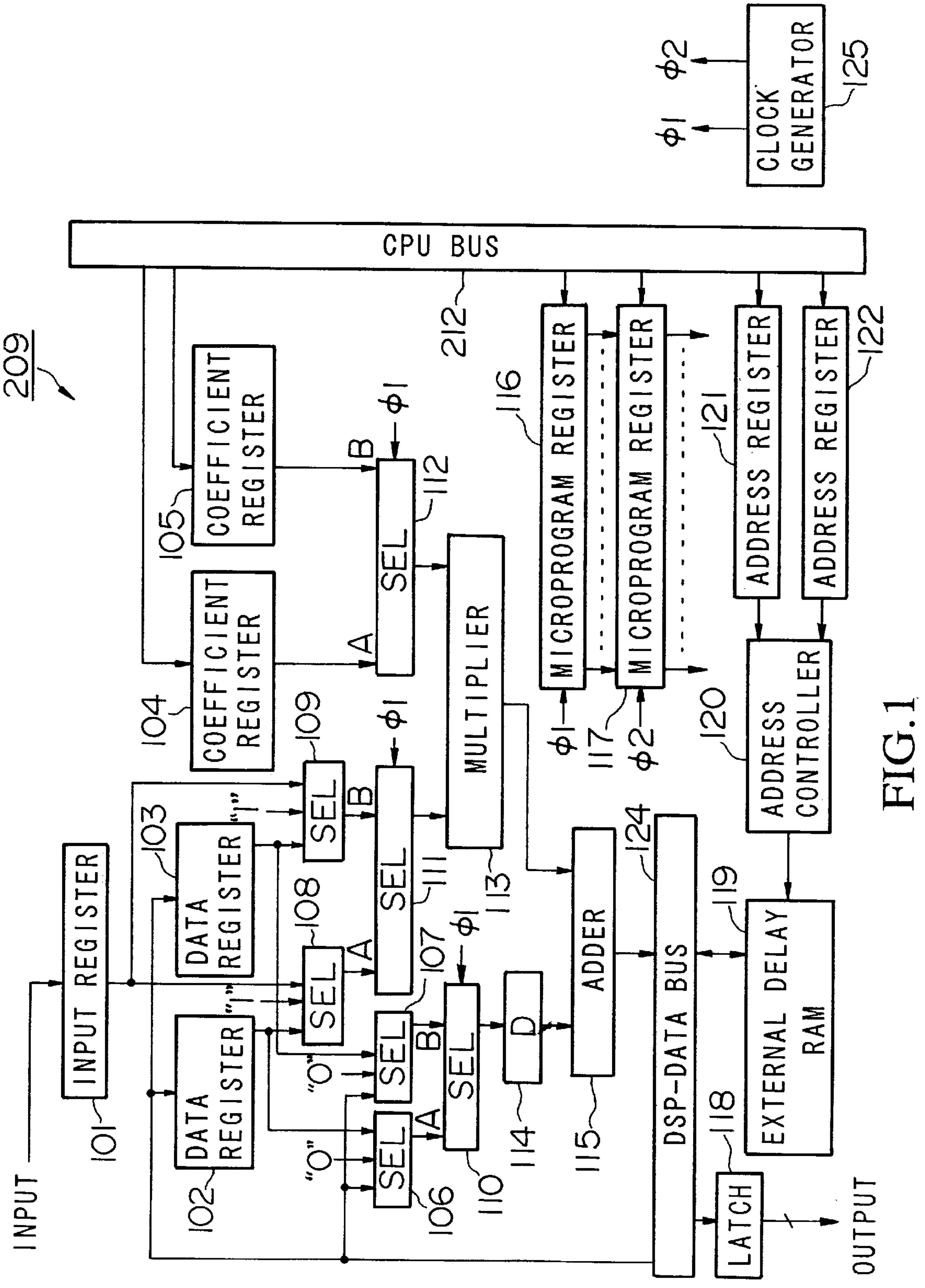
FIG. 1 is a block diagram showing a detailed configuration of a DSP which is designed in accordance with a first embodiment of the present invention.
Figure 2:
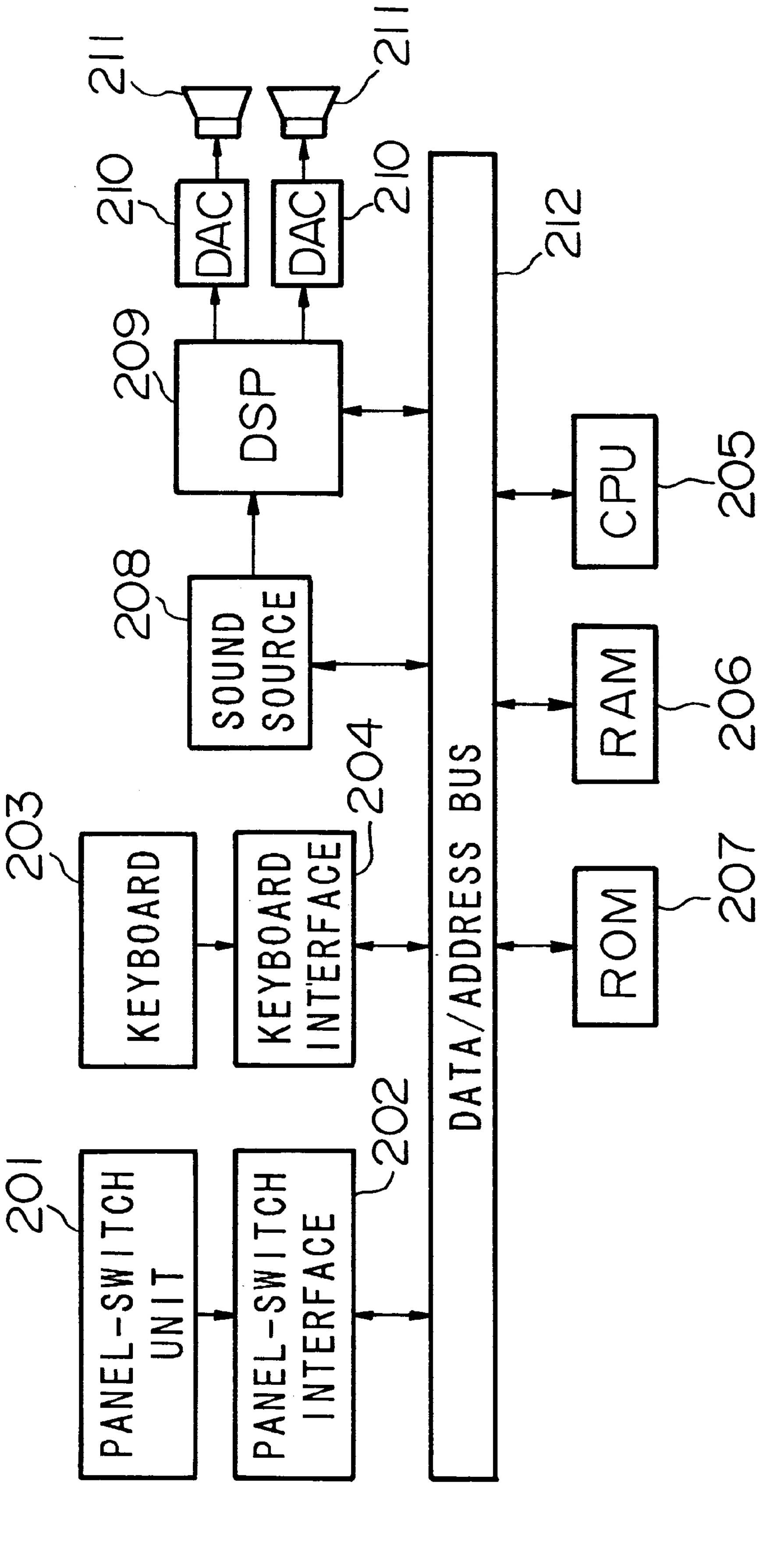
FIG. 2 is a block diagram showing an overall configuration of an electronic musical instrument employing the DSP according to the present invention.

FIG. 1 is a block diagram showing an electronic configuration of a digital signal processing device, i.e., DSP, which is designed in accordance with the first embodiment of the present invention. FIG. 2 is a block diagram showing an overall configuration of an electronic musical instrument which employs the DSP, shown in FIG. 1, as the effect imparting device which imparts a variety of sound effects, such as the distortion and reverberation, to the digital musical tone signals.

[A] Electronic musical instrument

Firstly, the electronic musical instrument will be described with reference to FIG. 2. This electronic musical instrument comprises a panel-switch unit 201, a panel-switch interface 202, a keyboard 203, a keyboard interface 204, a central processing unit (i.e., CPU) 205, a random-access memory (i.e., RAM) 206, a read-only memory (i.e., ROM) 207, a sound source 208, a DSP 209, a digital-analog converter (represented by "DAC") 210, a sound system 211 and a data/address bus 212.

The panel-switch unit 201 provides a variety of panel switches by which a variety of musical parameters, such as the tone color and kind of sound effect, are designated. Panel operation information, which is created responsive to a manual operation to each panel switch in the panel-switch unit 201, is transmitted onto the bus 212 through the panel-switch interface 202 so that the contents thereof are informed to the CPU 205. The keyboard 203 provides a plurality of keys which the performer plays. Performance information, representative of musical performance which is made by playing the keyboard 203, is supplied to the CPU 205 through the keyboard interface 204 and the bus 212 in turn.

The sound source 208 produces digital musical tone signals in response to an instruction set from the CPU 205. Based on another instruction set from the CPU 205, the DSP 209 imparts the sound effect to the digital musical tone signals. Then, the digital musical tone signals, to which a certain sound effect has been imparted, are converted into analog signals by the DAC 210. Thus, the sound system 211 produces musical sounds based on the analog signals.

The sound source 208 operates in synchronism with a clock signal, having a certain sampling period which is determined in advance, so as to output the digital musical tone signals. For convenience' sake, the embodiments of the present invention describe in such a manner that the sound source 208 outputs one waveform-amplitude data by every sampling period. Of course, the present invention is not limited by that technical matter of the embodiments; hence, the present invention can be applied to the system which performs processing on multiple channels as well as the system which performs stereophonic sounding.

The CPU 205 manages and controls overall operations of the electronic musical instrument. Particularly, the CPU 205 outputs an instruction set to produce the musical tone to the sound source 208 in response to the performance information given from the keyboard 203. If the sound effect to be imparted to the musical tones is designated by operating the panel switch, an effect program (i.e., microprogram) is required in order to impart the sound effect designated to the digital musical tone signals. In that case, the CPU 205 reads out the effect program from the ROM 207 so as to send it to the DSP 209.

For example, when the performer intends to impart the distortion plus reverberation to the musical tones, a set of distortion program and reverberation program are sent to the DSP 209. By executing the microprograms corresponding to the above set of programs, the DSP 209 imparts the sound effect to the digital musical tone signals outputted from the sound source 208.

The storage areas of the RAM 206 are used as working areas for the electronic musical instrument. The ROM 207 stores programs, to be executed by the CPU 205, as well as the microprograms which are used to impart the sound effects to the musical tone signals.

In general, the microprogram consists of a series of binary codes. However, when creating the microprogram, the designer writes down it by the simple programming language of the assembly type; and then, the microprogram written by the programming language is converted into the binary codes by a specific assembler so that the binary codes are stored by the DSP. In that case, the microprogram is temporary stored by some memory outside of the DSP. In the embodiments of the present invention, the ROM 207 stores the microprogram in order to meet the demand in changing the contents of the microprogram when performing a specific signal processing. That is, the ROM 207 stores a plurality of microprograms, each consisting of the binary codes, so that one microprogram is selectively transferred to the microprogram register of the DSP in response to the signal processing.

[B] First embodiment of the DSP

Next, the first embodiment of the DSP will be described in detail with reference to FIG. 1.

According to the first embodiment of the present invention, the DSP 209 comprises an input register 101, data registers 102 and 103, coefficient registers 105 and 105, selectors 106 to 112, a multiplier 113, a delay circuit 114, an adder 115, microprogram registers 116 and 117, a latch 118, an external delay RAM 119, an address controller (i.e., address control circuit) 120, address registers 121 and 122, and a clock generator 125. Herein, all of the adder 115, the external delay RAM 119 and the latch 118 are mutually interconnected together by means of a DSP-data bus 124.

The above-mentioned DSP 209 is connected to a CPU bus 212 which corresponds to the aforementioned data/address bus of FIG. 2. All parts of the DSP 209 shown in FIG. 1, except the external delay RAM 119, are fabricated on one chip. The external delay RAM 119 is provided to create a large storage capacity.

The input register 101 inputs the digital musical tone signals which are outputted from the sound source 208 of FIG. 2. In a duration in which the sound source 208 is continuously outputting the digital musical tone signals, a write signal, given from either the microprogram register 116 or 117, is continuously supplied to the input register 101. Thus, the input and storage for the data are carried out by the input register 101.

Each of the data registers 102 and 103 temporarily stores results of addition, given from the adder 115 and/or data given from the external delay RAM 119. Hence, each of those registers 102 and 103 comprises a plurality of storage areas which store them. The writing operation, reading operation and address designating operation for those registers are carried out in accordance with the microprograms, stored in the microprogram registers 116 and 117, (specifically, microinstructions read out from the microprogram registers 116 and 117).

Each of the coefficient registers 104 and 105 comprises a plurality of storage areas, wherein the storage areas store coefficient data which are sent from the CPU 205 of FIG. 2 through the CPU bus 212. Data read from the coefficient register 104 are supplied to a terminal 'A' of the selector 112, while data read from the coefficient register 105 are supplied to a terminal 'B' of the selector 112. Based on a clock signal ø 1, the selector 112 selects one of two terminals thereof so as to output the data selected to the multiplier 113. The clock signal ø 1 is made by a pulse train, in which a high level ('H' level) and a low level ('L' level) alternatively emerge. In the duration corresponding to the 'H' level of the clock signal ø 1, the selector 112 selects the terminal 'A' so as to output its data. In the duration corresponding to the 'L' level, the selector 112 selects the terminal 'B' so as to output its data.

Incidentally, the coefficients stored by the coefficient registers 104 and 105 can be rewritten in real time in accordance with an instruction which is supplied thereto from the CPU 205 of FIG. 2 through the CPU bus 212. Thus, it is possible to change the coefficients, used for the filtering operations, in response to operations to an external controller (not shown) which is manually operated by the user. Therefore, it is possible to control the tone color in real time.

The selector 108 provides three inputs which respectively receive an output of the data register 102, a constant '1' and an output of the input register 101; hence, the selector 108 selectively outputs one of them. Similarly, the selector 109 provides three inputs which respectively receive an output of the data register 103, a constant '1' and the output of the input register 101; hence, the selector 109 selectively outputs one of them. The constant '1' is provided to put the multiplier 113 in a "through state" so that only the adder 115 is used.

The selector 106 provides three inputs which respectively receive the output of the data register 102, data transmitted from the DSP-data bus 124 (i.e., an output of the adder 115 or an output of the external delay RAM 119) and a constant '0'; hence, the selector 106 selectively outputs one of them. The selector 107 provides three inputs which respectively receive the output of the data register 103, the data transmitted from the DSP-data bus 124 and a constant '0'; hence, the selector 107 selectively outputs one of them. The constant '0' is provided in order that by applying the constant '0' to one terminal of the adder 115, only the results of multiplication of the multiplier 113 are transmitted onto the DSP-data bus 124 through the adder 115.

Selection processing for the selectors 108, 109, 106 and 107 is performed in response to the microinstructions read out from the microprogram registers 116 and 117.

The selector 110 provides two terminals, wherein a terminal 'A' receives an output of the selector 106, while a terminal 'B' receives an output of the selector 107; hence, the selector 110 selectively outputs one of them. An output of the selector 110 is delayed by a certain delay time in the delay circuit 114; and then, the output delayed is supplied to the adder 115. Similarly, the selector 111 provides two terminals, wherein a terminal 'A' receives an output of the selector 108, while a terminal 'B' receives an output of the selector 109; hence, the selector 111 selectively outputs one of them. Each of the selectors 110 and 111 selects the terminal 'A' in the 'H'-level period of the clock signal ø 1, while each of them selects the terminal 'B' in the 'L'-level period of the clock signal ø 1.

Outputs of the selectors 111 and 112 are supplied to the multiplier 113. The multiplier 113 performs the multiplication on them; and then, result of the multiplication is supplied to the adder 115.

The adder 115 adds an output of the delay circuit 114 and an output of the multiplier 113 together, so that result of the addition is transmitted onto the DSP-data bus 124. All of the multiplier 113, the delay circuit 114 and the adder 115 construct the aforementioned arithmetic unit of the DSP 209. This arithmetic unit is designed such that arithmetical operations can be performed '256' times in one sampling period. In other words, the arithmetic unit is designed to perform '256' steps of arithmetic processing in one sampling period.

In addition, the multiplier 113 and the adder 115 operate in accordance with the pipeline processing. In first step, the multiplier 113 performs a former-half part of the multiplication; in second step, the multiplier 113 performs a latter-half part of the multiplication and the adder 115 performs the addition using the result of multiplication as well. In the second step, the multiplier 113 performs a certain part of another multiplication as well. The delay circuit 114 is provided to synchronize the timings by which two data are inputted to the adder 115.

Each of the microprogram registers 116 and 117 stores a microinstruction set of '128' steps which are executed in one sampling period. In other words, each of the microprogram registers 116 and 117 consists of '128' stages of shift registers, within which data circulates once by one sampling period. Herein, one stage of shift register stores one step of the microinstruction set. One microinstruction is read from the microprogram register 116 in the 'H'-level period of the clock signal ø 1. On the other hand, one microinstruction is read from the microprogram register 117 in a 'H'-level period of an inverted clock signal ø 2.

A change to the sound effect designated is realized by rewriting the microprogram. The microprograms to be rewritten are stored in the ROM 207 of FIG. 2 which coupled with the CPU bus 212. Specific microprogram in the ROM 207 is designated by operating the panel switch, by designating the tone color or by designating a sequence of program change. In that case, the CPU 205 of FIG. 2 reads out the microprogram designated from the ROM 207 so as to write it into the microprogram registers 116 and 117.

The latch 118 is provided to latch the digital musical tone signal to which the sound effect has been imparted. An output of the latch 118 is supplied to the DAC 210, by which it is converted into the analog signal.

The external delay RAM 119 is used to produce a delay signal. The reading operation or writing operation is designated for the delay signal by the microprogram (i.e., the microinstruction read from the microprogram register 116 or 117). The addresses used for the read/write operations are outputted from the address controller 120. In order to convert relative addresses, outputted from the address registers 121 and 122, into absolute addresses, the address controller 120 is configured by a control circuit which adds an address-offset number to the relative addresses. The address-offset number is an output of an address counter (not shown). The address counter is configured by a down-counter which decreases a range of addresses, corresponding to an overall storage area of the external delay RAM 119, one by one in one sampling period.

Each of the address registers 121 and 122 stores addresses such that a desired address can be outputted therefrom at a certain access timing which responds to the microprogram (i.e., microinstruction read from the microprogram register 116 or 117), wherein the address to be outputted is relative address which is made under the condition where the head address of the external delay RAM 119 is assumed as '0'.

Figure 5:
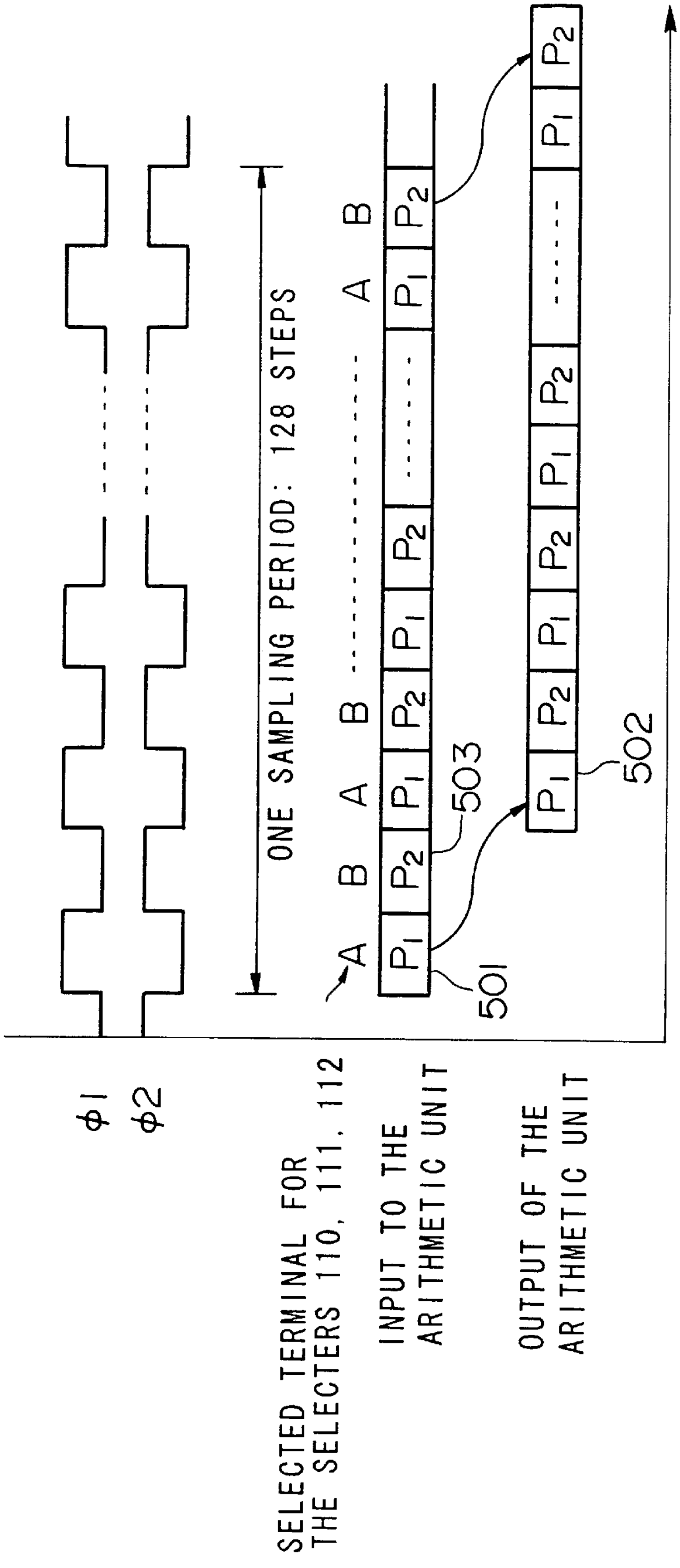
FIG. 5 is a time chart showing an execution manner for microprograms to be executed in synchronism with clock signals.

The clock generator 125 generates the clock signals ø 1 and ø 2 which are delivered to internal portions of the DSP 209. The level of the clock signal ø 1 is alternatively changed between the 'H' level and 'L' level by each of certain intervals of time. Herein, 128 cycles of the clock signal ø 1 are contained in one sampling period. As shown in FIG. 5, there exists 128 'L'-level periods and 128 'H'-level periods in the one sampling period. The inverted clock signal ø 2 is made by inverting the clock signal ø 1. In those clock signals, one interval of time, which corresponds to the 'H'-level period or 'L'-level period, will be sometimes referred to as a simple word called "interval" in the description below.

As described before, each of the microprogram register 116 and 117 stores the microprogram containing a series of microinstructions consisting of 128 steps which are executed in one sampling period. In response to the clock signals ø 1 and ø 2, one microinstruction is read out alternatively from the microprogram registers 116 and 117. In the 'H'-level period of the clock signal ø 1, the microinstruction is read from the microprogram register 116 and is executed. In the 'H'-level period of the inverted clock signal ø 2 (in other words, in the 'L'-level period of the clock signal ø 1), the microinstruction is read from the microprogram register 117 and is executed. Therefore, the DSP 209 as a whole is designed to execute '256' steps of the microinstruction set in one sampling period.

As for the microinstruction which is read from the microprogram register 116 in the 'H'-level period of the clock signal ø 1, the arithmetic unit performs arithmetical operations of 128 steps in one sampling period in response to the microprogram. This indicates that the data register 102 and the coefficient register 104 should supply a certain set of data and coefficient for every step of the arithmetical operation if they are required. For this reason, each of the data register 102 and the coefficient register 104 is configured by 128 stages of shift registers, in which one data circulates once in one sampling period. Similarly, the address register 121 is configured by 128 stages of shift registers in which one data circulates once in one sampling period.

As similar to the aforementioned registers, each of the coefficient register 105 and the address register 122 is configured by 128 stages of shift registers in which one data circulates once in one sampling period. Herein, the coefficient register 105 stores the coefficients which are used to execute the microprogram, while the address register 122 stores the addresses.

Incidentally, the configuration of the DSP 209 shown in FIG. 1 does not include an interpolation circuit and/or a low-frequency oscillator; however, those can be incorporated in the DSP 209. Herein, the interpolation circuit is used to interpolate the coefficient, given from the coefficient register, so that the coefficient interpolated is used to execute the arithmetical operation in the arithmetic unit. The low-frequency oscillator is used to produce a waveform of modulation (e.g., triangular wave, sawtooth wave or sine wave) which is used to perform the amplitude modulation or delay-time modulation.

[C] Processing of the programs

FIGS. 3A to 3F show examples of data which are stored by the microprogram registers 116, 117, the coefficient registers 104, 105, and the address registers 121, 122 respectively. FIG. 4A is a block diagram showing functions of the DSP 209 which acts as the effect imparting device using the data shown in FIGS. 3A to 3F.

Figures 3A, 3B, 3C:
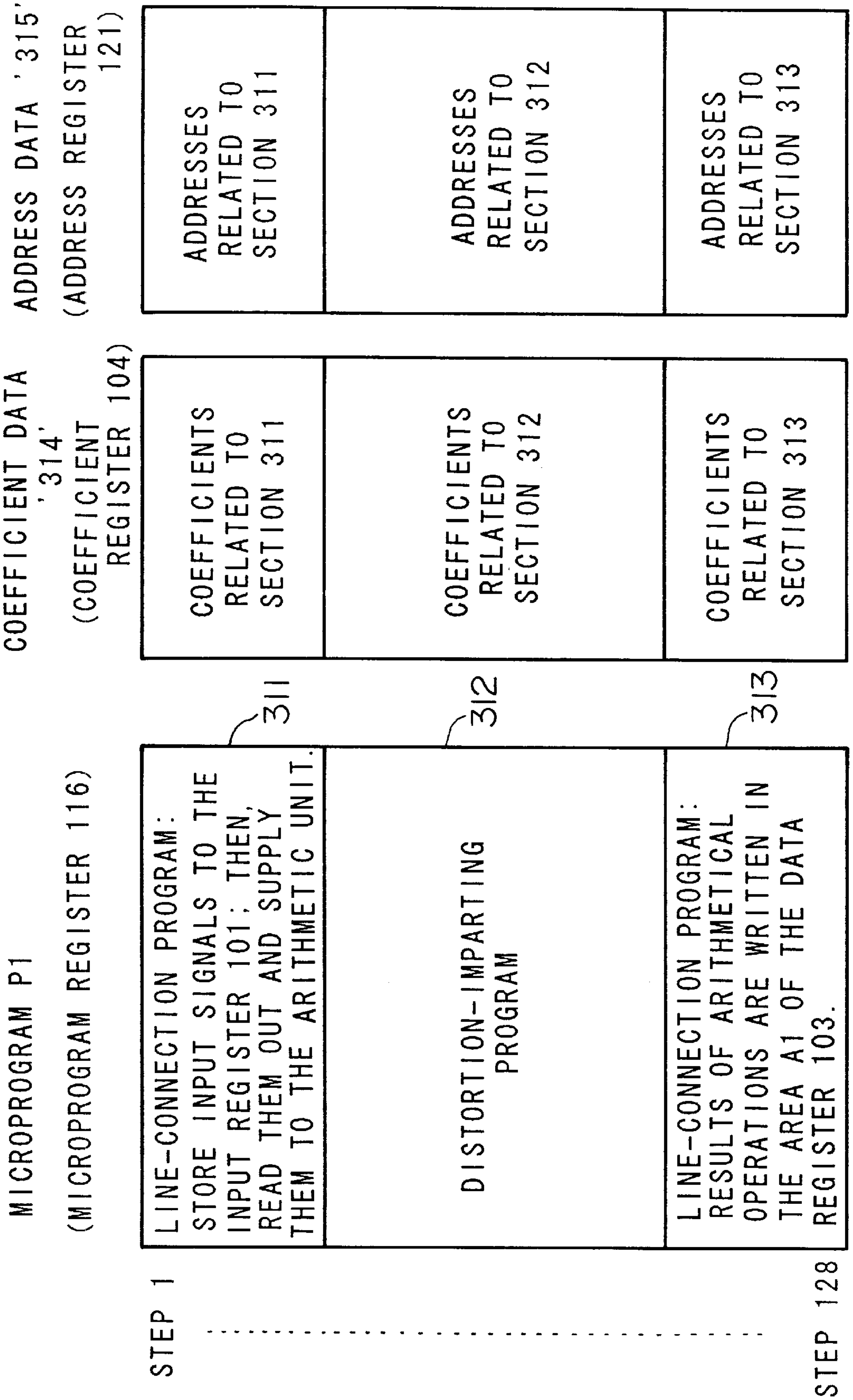
FIGS. 3A to 3F are drawings showing contents of data stored by registers of the DSP shown in FIG. 1.
Figure 4A:
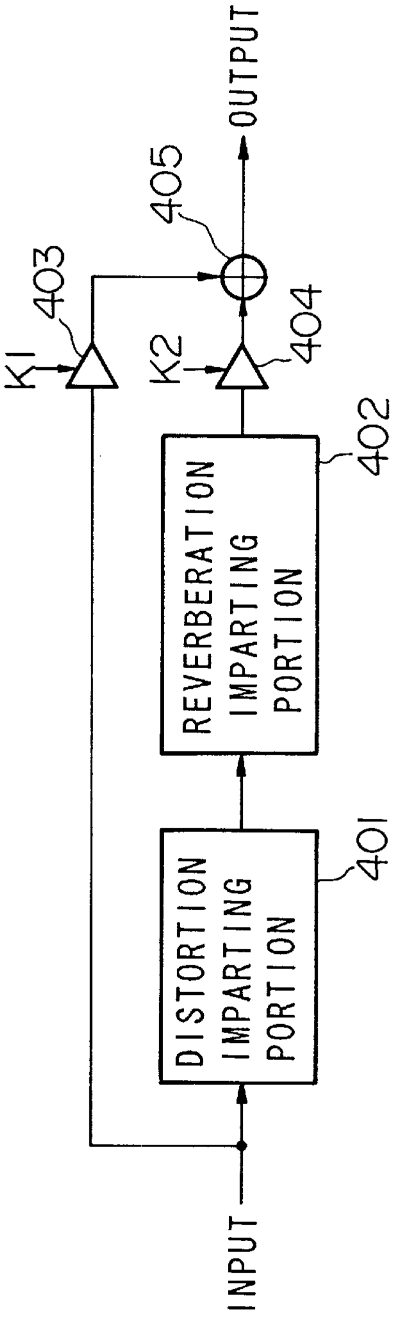
FIG. 4A is a block diagram showing an example of an effect imparting device to be realized by the DSP of FIG. 1.

As shown in FIG. 3A, the microprogram register 116 stores a microprogram 'P1'. The microprogram P1 consists of 128 steps of the microinstruction set. As shown in FIG. 3B, the coefficient register 104 stores coefficient data '314' which are provided for the 128 steps of the microinstruction set in the microprogram P1. As shown in FIG. 3C, the address register 121 stores address data '315' which are provided for the 128 steps of the microinstruction set in the microprogram P1. The microprogram P1 can be roughly divided into three sections '311', '312' and '313'.

The section '311' indicates a line-connection program which carries out a series of actions by which input signals (i.e., waveform-amplitude data given from the sound source 208) are stored in the input register 101 and then they are supplied to the multiplier 113 in the arithmetic unit. Specifically, the line-connection program carries out processings ① to ③, as follows:

① To store the input signals in the input register 101.

② To switch over the selector 108 so that the output of the input register 101 is supplied to the terminal 'A' of the selector 111.

③ To deliver the data supplied to the terminal 'A' of the selector 111 to the multiplier 113.

The above processing ③ is carried out because the microprogram P1 is read out only in the 'H'-level period of the clock signal ø 1, and the selector 111 selects the terminal 'A' at that period.

The section '312' (see FIG. 3A) indicates a distortion-imparting program by which a certain distortion is imparted to the input signals. Specifically, the distortion-imparting program carries out processings ① to ⑥, as follows:

① The multiplier 113 performs multiplication using the data supplied thereto from the selectors 111 and 112 respectively. Incidentally, the coefficient data, used by the multiplication, is read from the coefficient register 104 in response to the microinstruction; and that coefficient data is delivered to the multiplier 113 through the selector 112 because the terminal 'A' is selected in the 'H'-level period of the clock signal ø 1.

② The adder performs addition using the output of the delay circuit 114 as well as result of multiplication of the multiplier 113. The output of the delay circuit 114 corresponds to the output of the data register 102 or data transmitted from the DSP-data bus 124. Specifically, the output of the data register 102 is supplied to the selector 106, while either output of the adder 115 or output of the external delay RAM 119 is transmitted to the selector 106 through the DSP-data bus 124; hence, the selector 106 selects one of them; and then, the data selected is supplied to the delay circuit 114 through the selector 110 because in the 'H'-level period of the clock signal ø 1, the terminal 'A' of the selector 110 is selected. The above-mentioned data retained in the delay circuit 114 is used for the addition performed by the adder 115.

③ The result of addition of the adder 115 is transmitted through the DSP-data bus 124 and the selectors 106, 110 and is written into the delay circuit 114. Or, the result of addition is transmitted onto the DSP-data bus 124, from which it is supplied to and written into the external delay RAM 119 and the data register 102. Particularly, when writing it into the external delay RAM 119, the absolute address is used, wherein the absolute address is produced in the address controller 120 by converting the relative address read from the address register 121.

④ The output of the external delay RAM 119 is written into the data register 102 and the delay circuit 114 if it is required.

⑤ The data retained in the data register 102 is read out and is supplied to the multiplier 113 through the selectors 108 and 111. In addition, the coefficient data is read from the coefficient register 104 and is supplied to the multiplier 113 through the selector 112. Designation for the read address of the data register 102 and selection for the selector 108 are made responsive to the microinstructions read out.

⑥ By repeating the aforementioned processings ① to ⑤, the arithmetical operations are repeated; hence, final results of the arithmetical operations are obtained. They represent the musical tone signals to which the distortion is imparted.

The section '313' (see FIG. 3A) indicates a line-connection program by which the result of the arithmetical operation is stored in a predetermined area 'A1' of the data register 103. In other words, the result of addition of the adder 115 is transmitted onto the DSP-data bus 124, from which it is supplied to the data register 103 in which it is written into the area A1.

Figures 3D, 3E, 3F:
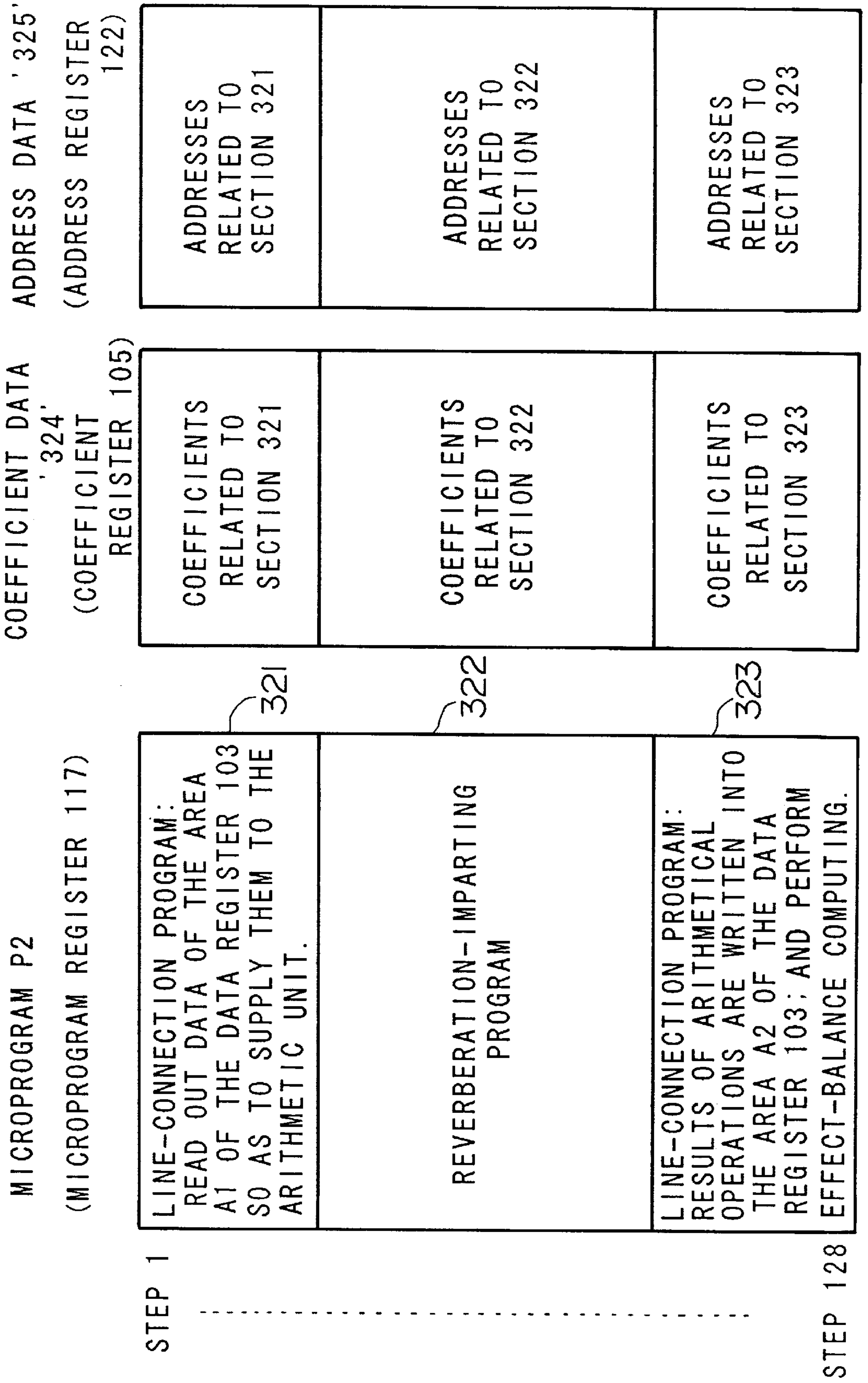

Next, a microprogram 'P2' will be described. As shown in FIG. 3D, the microprogram register 117 stores the microprogram P2. As similar to the foregoing microprogram P1, the microprogram P2 consists of 128 steps of an microinstruction set. Multiple coefficient data '324' (see FIG. 3E), which are stored by the coefficient register 105, respectively correspond to the 128 steps of the microinstruction set in the microprogram P2. In addition, multiple address data '325' (see FIG. 3F), which are stored by the address register 122, respectively correspond to the 128 steps of the microinstruction set in the microprogram P2. The microprogram P2 can be roughly divided into three sections '321', '322' and '323'.

The section '321' of FIG. 3D indicates a line-connection program by which the data retained at the prescribed area A1 of the data register 103 are read out and are supplied to the multiplier 113 in the arithmetic unit. Specifically, the line-connection program carries out processings ① and ②, as follows:

① The selector 109 is switched over so that the data retained at the prescribed area A1 of the data register 103 are supplied to the terminal 'B' of the selector 111. The data retained at the prescribed area A1 correspond to the results of the arithmetical operations which have been performed in a previous sampling period by executing the microprogram P1; in other words, those data correspond to the musical tone signals to which the distortion is imparted.

② The data supplied to the terminal 'B' of the selector 111 are supplied to the multiplier 113. Because, the microprogram P2 can be read out only in the 'H'-level period of the inverted clock signal ø 2; and the selector 111 selects the terminal 'B' at that period.

The section '322' of FIG. 3D indicates a reverberation-imparting program by which a certain reverberation effect is imparted to the input data. The same procedure of processing of the aforementioned distortion-imparting program '312' is employed for the reverberation-imparting program '322'. However, different from the distortion-imparting program '322' of the microprogram P1, the microprogram P2, to which the reverberation-imparting program '322' belongs, is read out in the 'H'-level period of the inverted clock signal ø 2. In that period, the terminal 'B' is selected for all of the selectors 110, 111 and 112 so that the data register 103 and the coefficient register 105 are used. In addition, the address register 122 is used. Further, the DSP 209 naturally employs a certain set of arithmetical operations which are used to impart the reverberation to the musical tone signals.

The section '323' of FIG. 3D indicates a line-connection program by which results of the arithmetical operations, representing the musical tone signals to which the reverberation is imparted, are stored in a predetermined area 'A2' of the data register 103 and by which an effect-balance computing is performed as well. Specifically, the line-connection program carries out processings ① to ③, as follows:

① The data, outputted from the adder 115, which correspond to results of the aforementioned reverberation-imparting program '322', are transmitted onto the DSP-data bus 124, from which they are supplied to the data register 103 and are written into the prescribed area A2.

② The effect-balance computing is performed using the input signals, stored by the input register 101, as well as the data which are stored by the prescribed area A2 and to which the reverberation effect has been imparted. The effect-balance computing consists of a sequence of operations. At first, the output of the input register 101 is transmitted through the selectors 109 and 111 and is supplied to the multiplier 113 in which it is multiplied by a certain coefficient 'k1', wherein the coefficient 'k1' is read from the coefficient register 105 and is transmitted to the multiplier 113 through the selector 112. In that case, the adder 115 is set such that the result of multiplication is added to '0'. Thus, the result of multiplication substantially passes through the adder 115. Then, the result of multiplication is transmitted through the DSP-data bus 124 and is supplied to the data register 103 in which it is stored in a certain area 'A3'. Next, the data retained at the prescribed area A2 is multiplied by a coefficient 'k2' in the multiplier 113; and then, a result of multiplication is supplied to the adder 115 in which it is added to the data of the prescribed area A3. The sequence of operations described above complete the effect-balance computing. Thereafter, final data, on which the effect-balance computing has completed, are obtained.

③ The final data are stored in the latch 118, from which they are outputted to an external circuit of the DSP 209.

By executing the microprograms P1 and P2 in the DSP 209, the DSP 209 acts as the effect imparting device as shown in FIG. 4A.

The effect imparting device, shown by FIG. 4A, is configured by a distortion imparting portion 401, a reverberation imparting portion 402, multipliers 403 and 404, and an adder 405. Herein, the distortion imparting portion 401 imparts a distortion to an input signal, while the reverberation imparting portion 402 imparts a reverberation to an output of the distortion imparting portion 401. The input signal is multiplied by the coefficient k1 in the multiplier 403. An output of the reverberation imparting portion 402, to which a set of the distortion and reverberation have been imparted, is multiplied by the coefficient k2 in the multiplier 404. Then, outputs of the multipliers 403 and 404 are added together by the adder 405.

Next, relationship between each of the programs, shown in FIGS. 3A to 3F, and configuration of the effect imparting device shown in FIG. 4A will be described.

In FIG. 4A, a line, which introduces the input signal to the distortion imparting portion 401, corresponds to the line-connection program '311' of the microprogram P1. The function of the distortion imparting portion 401 corresponds to the distortion-imparting program '312' of FIG. 3A. A line, laid between the distortion imparting portion 401 and the reverberation imparting portion 402, corresponds to both of the line-connection program '313' of the microprogram P1 and the line-connection program '321' of the microprogram P2.

The reverberation imparting portion 402 of FIG. 4A corresponds to the reverberation-imparting program '322' of FIG. 3D. A part of FIG. 4A, consisting of the multipliers 403, 404 and the adder 405, corresponds to the line-connection program '323' of FIG. 3D. In that part of FIG. 4A, the input signal is multiplied by the coefficient k1 in the multiplier 403; the output of the reverberation imparting portion 402 is multiplied by the coefficient k2 in the multiplier 404; and the adder 405 adds the results of multiplication together to produce an output signal.

Incidentally, each of the data registers 102 and 103 has multiple storage areas (or multiple addresses) and is configured by a dual-port RAM. Hence, both of the programs P1 and P2 can access to each of the data registers 102 and 103. In other words, both of the programs P1 and P2 can share the common data. Therefore, by performing an adequate data transmission, it is possible to freely modify the line connection established among the circuit elements in the effect imparting device so as to realize the configuration shown in FIG. 4A.

FIG. 5 is a time chart showing relationship between input/output timings of the arithmetic unit and selected terminals of the selectors in connection with the clock signals ø 1 and ø 2. Now, execution manner for the microprograms P1 and P2, which are alternatively executed, will be described in detail with reference to FIG. 5.

Each of the clock signals ø 1 and ø 2 contains '128' cycles which emerge in turn in one sampling period. In other words, each of the clock signals contains '256' intervals in one sampling period. Herein, one interval is an interval of time in which a certain level (i.e., 'H' level or 'L' level) is sustained in each clock signal.

In the 'H'-level interval of the clock signal ø 1, a series of microinstructions of the microprogram P1 (see FIG. 3A) are sequentially read from the microprogram register 116. In that interval, all of the selectors 110, 111 and 112 select the same terminal 'A'. Further, the address data of the address register 121 is used. Therefore, the data respectively outputted from the data register 102, the coefficient register 104 and the address register 121 are used, if they are required, so that the 128 steps of the microinstruction set in the microprogram P1 are executed.

In the 'L'-level interval of the clock signal ø 1 (in other words, in the 'H'-level interval of the inverted clock signal ø 2), a series of microinstructions of the microprogram P2 (see FIG. 3D) are sequentially read from the microprogram register 117. In that interval, all of the selectors 110, 111 and 112 select the same terminal 'B'. Further, the address data of the address register 122 is used. Therefore, the data respectively outputted from the data register 103, the coefficient register 105 and the address register 122 are used, if they are required, so that the 128 steps of the microinstruction set in the microprogram P2 are executed.

In FIG. 5, the selected terminal for all of the selectors 110, 111 and 112 is indicated, wherein the selected terminal is changed alternatively between 'A' and 'B'. A succession of blocks accompanied by a label called "INPUT TO THE ARITHMETIC UNIT" indicates a data-input manner of the arithmetic unit, while a succession of blocks accompanied by a label called "OUTPUT OF THE ARITHMETIC UNIT" indicates a data-output manner of the arithmetic unit. In the blocks, which respectively correspond to the intervals of the clock signals ø 1 and ø 2, letters 'P1' and 'P2' emerge alternatively. In an interval '501', data are inputted to the arithmetic unit in accordance with the microinstruction of the microinstruction program P1. In an interval '502', the result of the arithmetical operation, corresponding to the microinstruction of the microprogram P1, is outputted from the arithmetic unit. The multiplier 113 and the adder 115, which configure the arithmetic unit, are designed to perform the pipeline processing. Therefore, the input data to the arithmetic unit in the interval P1 are subjected to the arithmetical operation; and then, the result of the arithmetical operation is outputted from the arithmetic unit not in an interval '503', which is next to the interval '501', but in the interval '502'. In the interval '503', the arithmetic unit performs the arithmetical operation corresponding to the microinstruction of the microprogram P2.

As described above, the result of the arithmetical operation performed in first interval (e.g., '501') is outputted not in second interval (e.g., '502') but in third interval (e.g., '503'). In addition, the arithmetic unit performs the microinstructions of the microprograms P1 and P2 alternatively in response to the clock signals ø 1 and ø 2. Thus, a sequence of operations of the arithmetic unit can progress smoothly without a break; in other words, the arithmetic unit can be used efficiently in the present embodiment. The present embodiment can be applied to a certain kind of microprogram which contains two steps ① and ② as follows: the step ① instructs the arithmetic unit to input the data and to perform the arithmetical operation on that data; and the step ② describes a microinstruction by which result of the arithmetical operation is used for another operation, for example. In that case, the present embodiment executes the step ① in first interval; and then, the present embodiment executes the step ② in third interval which is next to second interval. In the third interval, the result of the step ① has been already outputted from the arithmetic unit; hence, it is possible to execute the step ② without a problem.

The present embodiment described above uses the configuration of FIG. 4A in which two portions 401 and 402 are connected in series. However, it is possible to modify the configuration of the effect imparting device which is realized by the DSP 209. For example, a configuration of FIG. 4B can be employed for the effect imparting device. In this configuration, it is not necessary to change the contents of the programs in the sections '312' and '322' (see FIGS. 3A and 3D). In addition, it is not necessary to change the contents of the line-connection programs in the sections '311' and '313'.

Figure 4B:
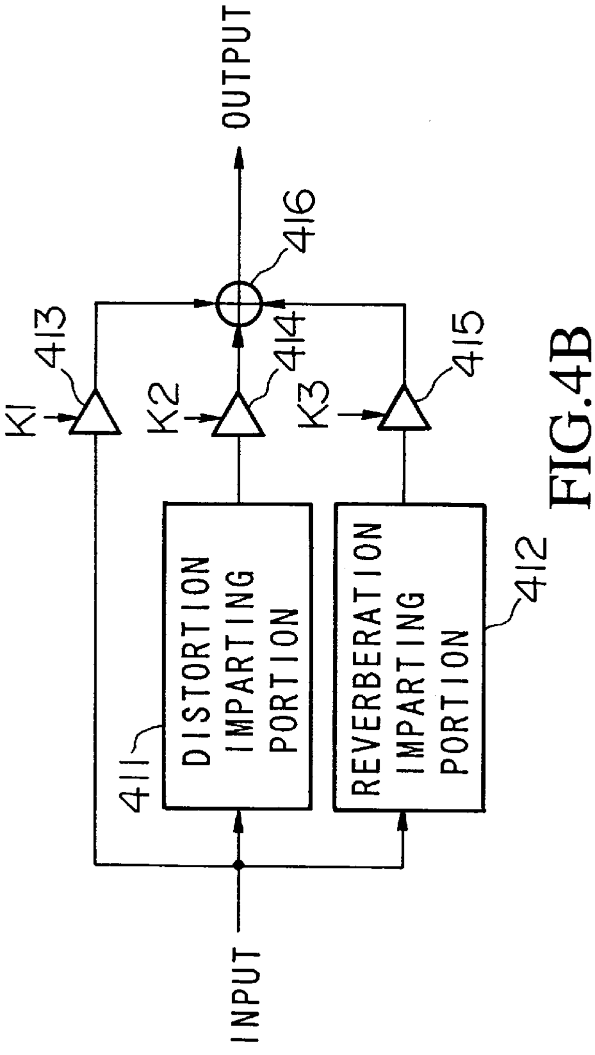
FIG. 4B is a block diagram showing another example of an effect imparting device to be realized by the DSP of FIG. 1.

However, when employing the configuration of FIG. 4B, it is necessary to change the contents of the line-connection programs '321' and '323'. The changed contents of the program '321' can be described as follows: "the input signals are read from the input register 101 and are supplied to the arithmetic unit". The changed contents of the program '323' can be described as follows: "the results of the arithmetical operations are stored in the area A2 of the data register 103; and then, the effect-balance computing is performed using the data which are stored in the input register 101, the area A1 of the data register 103 and the area A2 of the data register 103 respectively. Accordingly, the coefficient data and address data should be changed responsive to the requirements of the changed programs.

In the first embodiment, one input signal is subjected to distortion-imparting processing and reverberation-imparting processing, which are performed in series or in parallel, so as to produce one output signal. Of course, the first embodiment can be further modified. For example, the first embodiment can be modified such that specific effects, which are different from each other, are respectively imparted to two input signals so as to produce two output signals independently.

[D] Second embodiment of the DSP

Next, the second embodiment of the DSP will be described in detail.

Figure 6:
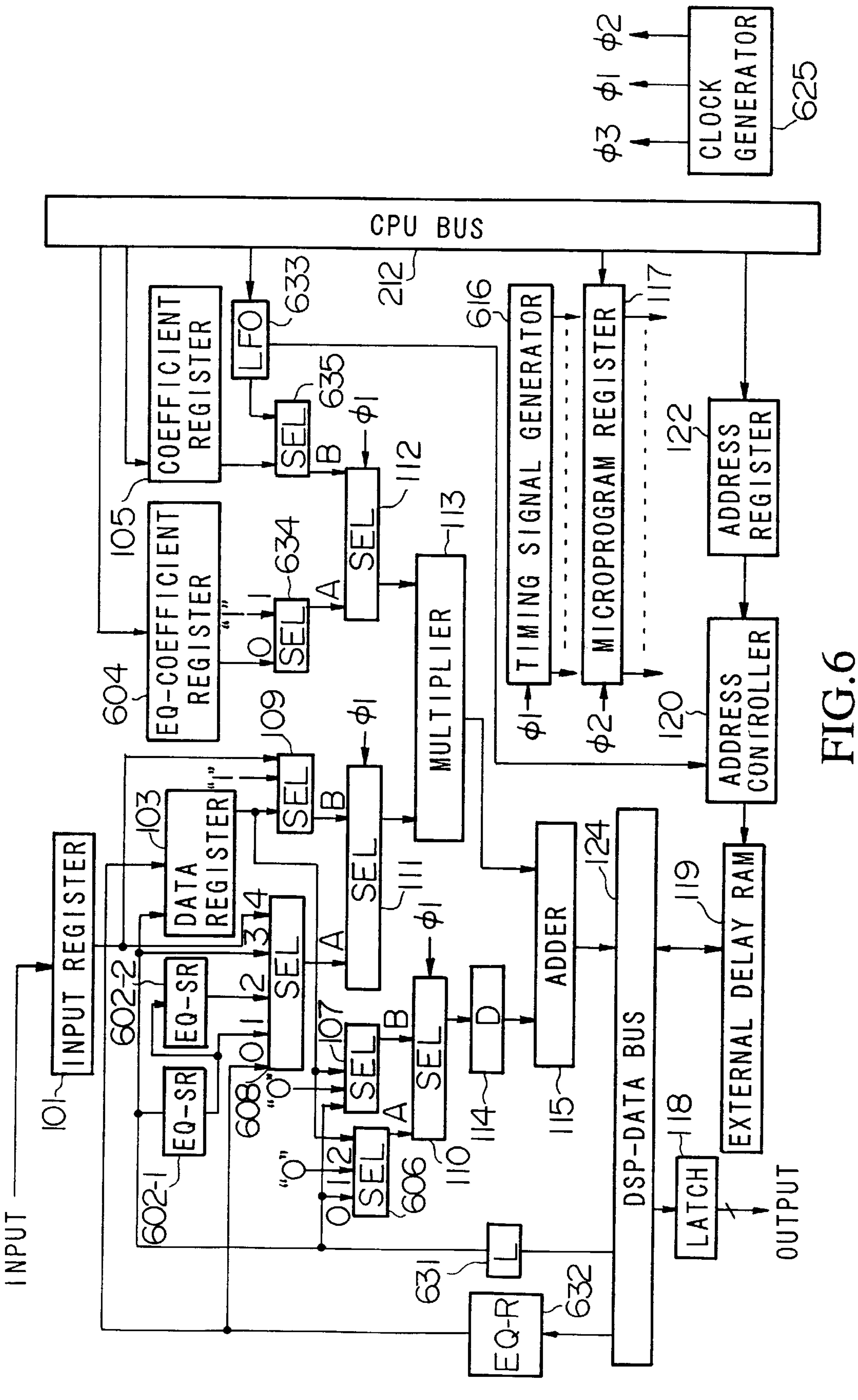
FIG. 6 is a block diagram showing a detailed configuration of a DSP which is designed in accordance with a second embodiment of the present invention.

FIG. 6 is a block diagram showing the detailed configuration of the DSP 209 according to the second embodiment. In FIG. 6, the parts corresponding to those shown in FIG. 1 will be designated by the same numerals; hence, the description thereof will be omitted. As similar to the foregoing DSP of FIG. 1, the DSP of FIG. 6 is designed to act as the effect imparting device for the electronic musical instrument of FIG. 2.

Figure 7:
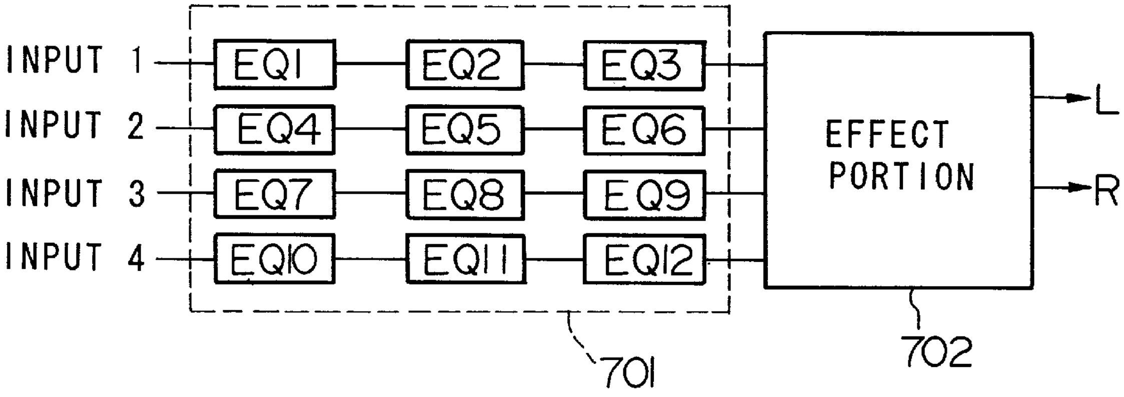
FIG. 7 is a block diagram showing an example of an effect imparting device to be realized by the DSP of FIG. 6.

FIG. 7 is a block diagram showing the configuration of the effect imparting device which is realized by the DSP of FIG. 6. The configuration of the effect imparting device of FIG. 7 can be roughly divided into two portions, i.e., an equalizer portion 701 and an effect portion 702. The effect imparting device inputs four input signals so as to produce two output signals for left-channel (L) and right-channel outputs.

The equalizer portion 701 is configured by twelve equalizers EQ1 to EQ12. A first input signal, represented by "INPUT 1", is subjected to equalization by three equalizers EQ1, EQ2 and EQ3, which are connected in series, so as to produce a first equalized signal. A second input signal, represented by "INPUT 2", is subjected to equalization by three equalizers EQ4, EQ5 and EQ6, which are connected in series, so as to produce a second equalized signal. A third input signal, represented by "INPUT 3", are subjected to equalization by three equalizers EQ7, EQ8 and EQ9, which are connected in series, so as to produce a third equalized signal. A fourth input signal, represented by "INPUT 4", are subjected to equalization by three equalizers EQ10, EQ11 and EQ12, which are connected in series, so as to produce a fourth equalized signal. All of the first to fourth equalized signals are supplied to the effect portion 702.

The effect portion 702 is designed to impart the specific effects, which are realized by the aforementioned distortion imparting portion 401 and the reverberation imparting portion 402.

Figure 8:
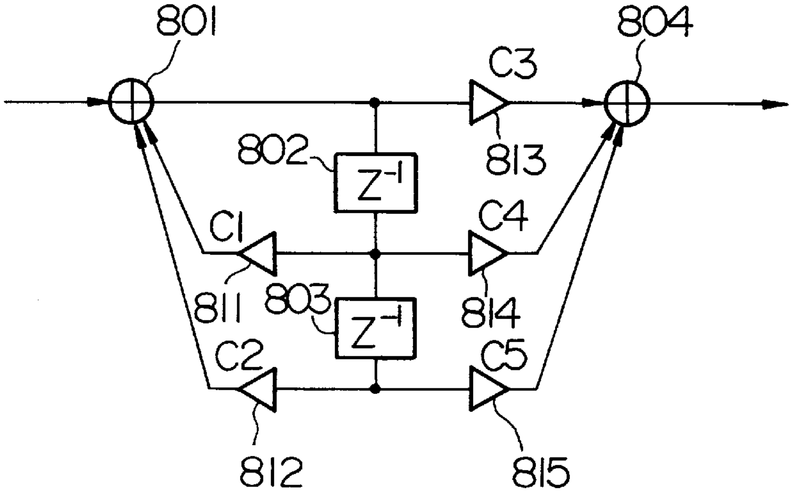
FIG. 8 is a block diagram showing a detailed configuration of an equalizer which configures a part of the effect imparting device of FIG. 7.

FIG. 8 shows an example of the equalizer which is realized by the DSP. This equalizer is configured by adders 801, 804, delay circuits 802, 803, and multipliers 811 to 815.

In FIG. 8, input data is applied to the adder 801. The adder 801 adds the input data to results of multiplication of the multipliers 811 and 812. Result of addition of the adder 801 is delivered to the multiplier 813 and the delay circuit 802 respectively. The delay circuit 802 delays an output of the adder 801 by one sampling period; and then, an output of the delay circuit 802 is delivered to the multipliers 811 and 814 as well as the delay circuit 803. The multiplier 811 multiplies the output of the delay circuit 802 by a multiplier factor 'C1' so as to produce result of the multiplication thereof, which is then outputted to the adder 801. The delay circuit 803 delays the output of the delay circuit 802 by one sampling period; and then, an output of the delay circuit 803 is delivered to the multipliers 812 and 815.

The multiplier 812 multiplies the output of the delay circuit 803 by a multiplier factor 'C2' so as to produce result of the multiplication thereof, which is then outputted to the adder 801. The multiplier 813 multiplies the output of the adder 801 by a multiplier factor 'C3' so as to produce result of the multiplication thereof, which is then outputted to the adder 804. The multiplier 814 multiplies the output of the delay circuit 802 by a multiplier factor 'C4' so as to produce result of the multiplication thereof, which is then outputted to the adder 804. The multiplier 815 multiplies the output of the delay circuit 803 by a multiplier factor 'C5' so as to produce result of the multiplication thereof, which is then supplied to the adder 804. The adder 804 adds outputs of the multipliers 813, 814 and 815 together so as to produce result of the addition thereof.

Now, the DSP of the second embodiment shown in FIG. 6 will be described in detail. Since the parts corresponding to those of FIG. 1 have been already described before, other parts of the second embodiment, which are not used in the first embodiment, will be described in detail.

In FIG. 6, the microprogram register 116 of FIG. 1 is replaced by a timing signal generator 616 so as to realize the equalizer. Of course, the function of the equalizer can be realized by using the microprogram. However, it can be realized by the hardware circuit such as the timing signal generator 616 easily because as shown by FIGS. 7 and 8, the equalizer itself is a simple circuit. As compared to the system which realizes the function of the equalizer by the microprogram, the present system which realizes it by the hardware circuit does not cause any trouble and is effective. As described above, the timing signal generator 616 is realized by the hardware circuit which is designed to independently produce specific timing signals. Therefore, the timing signal generator 616 is not interconnected with the CPU bus 212.

In the aforementioned DSP of FIG. 1, the microprograms P1 and P2 are alternatively read from the microprogram registers 116 and 117 in response to the clock signals ø 1 and ø 2 and are alternatively executed. Such architecture of FIG. 1 is employed by the DSP of FIG. 6 as well. In FIG. 6, in the 'H'-level interval of the clock signal ø 1, the timing signal generator 616 generates the timing signals, which play rolls as the foregoing microinstructions and by which equalization processing of the equalizer portion 701 of FIG. 7 is realized. In the 'H'-level interval of the inverted clock signal ø 2 (i.e., in the 'L'-level interval of the clock signal ø 1), the microinstructions are read from the microprogram register 117 so as to realize the processing of the effect portion 702.

In order to do so, the DSP of FIG. 6 provides the selectors 110, 111 and 112, each of which selects one of the terminals 'A' and 'B' in response to the clock signal ø 1. Hence, the DSP of FIG. 6 is similar to the DSP of FIG. 1 in terms of this technical point. As for part of the DSP of FIG. 6 which is activated by accessing the microprogram register 117 in the 'H'-level interval of the inverted clock signal ø 2, the part of the DSP of FIG. 6 as a whole performs the processing to impart the certain effects by using the data, which are retained by the input register 101, the data register 103 and the coefficient register 105 respectively. As for this point, the DSP of FIG. 6 is also similar to the DSP of FIG. 1.

Different from FIG. 1 in which the output of the coefficient register 105 is directly supplied to the terminal 'B' of the selector 112, the output of the coefficient register 105 in FIG. 6 is supplied to one terminal of a selector 635, from which it is supplied to the terminal 'B' of the selector 112. Another terminal of the selector 635 is provided to input data outputted from a low-frequency oscillator (represented by 'LFO') 633. As a result, an output of the LFO 633 can be used as the multiplier factor of the multiplier 113, so that the amplitude modulation can be performed on the musical tone signals. Further, the output of the LFO 633 is supplied to the address controller 120 as well. Thus, the access address to the external delay RAM 119 can be changed responsive to the output of the LFO 633, so that the delay-time modulation can be performed.

Next, the detailed description will be given with respect to a part of the DSP of FIG. 6, which realizes the equalizer portion 701 and which is the technical feature of the second embodiment.

An EQ-coefficient register 604 contains multiple storage areas which store EQ-coefficient data sent thereto by the CPU 205 of FIG. 2 through the CPU bus 212. The EQ-coefficient data correspond to multiplier factors for the multipliers used by the equalizer shown in FIG. 8. The EQ-coefficient data, read from the EQ-coefficient register 604, is supplied to one terminal of a selector 634. Another terminal of the selector 634 inputs a constant '1'. An output of the selector 634 is supplied to the terminal 'A' of the selector 112.

The selector 634 performs selection based on a selection control signal, consisting of one bit, which is generated by the timing signal generator 616. When the selection control signal is at '0', the selector 634 selects the EQ-coefficient data, given from the EQ-coefficient register 604. When the selection control signal is at '1', the selector 634 selects the constant '1'.

A latch 631 latches the data transmitted from the DSP-data bus 124. An output of the latch 631 is delivered respectively to the selectors 606, 107, an EQ shift register (represented by "EQ-SR") 602-1, a selector 608 and the data register 103. There are provided two shift registers, i.e., "EQ-SR" 602-1 and "EQ-SR" 602-2 which are provided to respectively realize the delay circuits 802 and 803 of the equalizer of FIG. 8. Each of those shift registers is designed to retain twelve words of data. An output of the EQ-SR 602-1 is delivered respectively to the selector 608 and the EQ-SR 602-2. An output of the EQ-SR 602-2 is supplied to the selector 608. A numeral "EQ-R" 632 denotes a temporary register which stores output data of one equalizer as shown in FIG. 8. An output of the EQ-R 632 is supplied respectively to the selector 608 and the data register 103.

The selector 608 is provided to select the data which is supplied to the multiplier 113. The selector 608 provides five terminals, which are numbered by '0' to '4'. The selector 608 performs selection based on a 3-bit selection control signal which is generated by the timing signal generator 616. The number indicated by the 3-bit selection control signal belongs to a certain range of integral numbers, in decimal notation, which are '0', '1', '2', '3' and '4'. When the 3-bit selection control signal has an integral number 'n', the selector 608 selects the corresponding terminal 'n', the data of which is selectively outputted.

The terminal 0 of the selector 608 inputs the data outputted from the EQ-R 632. The terminal 1 inputs data retained at the last stage of the EQ-SR 602-1. The terminal 2 inputs data retained at the last stage of the EQ-SR 602-2. The terminal 3 inputs the data latched by the latch 631. The terminal 4 inputs the data outputted from the input register 101.

A selector 606 is provided to select the data which is supplied to the adder 115. The selector 606 provides three terminals, which are numbered by '0' to '2' respectively. The selector 606 performs selection based on a 2-bit selection control signal which is generated by the timing signal generator 616. The number indicated by the 2-bit selection control signal belongs to a certain range of integral numbers, in decimal notation, which are '0', '1' and '2'. When the 2-bit selection control signal has an integral number 'n', the selector 606 selects the corresponding terminal 'n', the data of which is selectively outputted.

The terminal '0' of the selector 606 inputs the data outputted from the latch 631. In addition, the terminal '1' inputs a constant '0'; and the terminal '2' inputs the data outputted from the data register 103.

As similar to the foregoing clock generator 125 of FIG. 1, a clock generator 625 generates the clock signals ø 1 and ø 2. Further, the clock generator 625 generates a clock signal ø 3, which will be described later.

Figure 9:
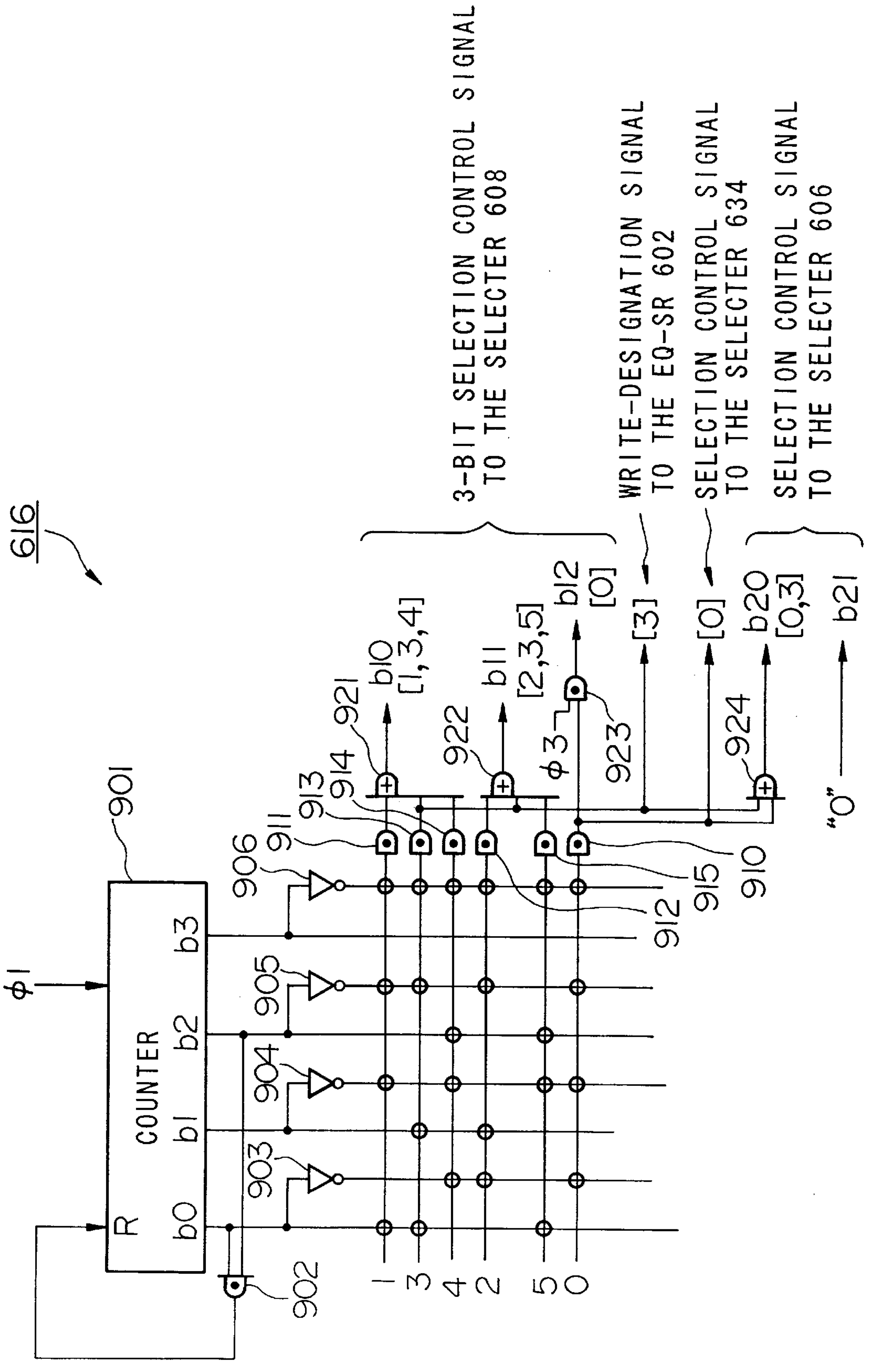
FIG. 9 is a circuit diagram showing a detailed configuration of a timing signal generator shown in FIG. 6.

FIG. 9 is a circuit diagram showing a detailed configuration of the timing signal generator 616. The timing signal generator 616 of FIG. 9 comprises a counter 901, an AND circuit 902, NOT circuits 903 to 906, AND circuits 910 to 915, OR circuits 921, 922, 924, and an AND circuit 923.

The counter 901 operates based on the clock signal ø 1. Specifically, the counter 901 is configured by a 4-bit up-counter which counts up the number thereof at every leading-edge timing of the clock signal ø 1 which emerges when the level of the clock signal ø 1 is changed from the 'L' level to the 'H' level. A 4-bit output of the counter 901 consists of first bit 'b0', second bit 'b1', third bit 'b2' and fourth bit 'b3' which are arranged in the binary notation from the right (corresponding to the bit position of the least significant bit) to the left (corresponding to the bit position of the most significant bit). The AND circuit 902 inputs the first and third bits b0 and b2, while an output of the AND circuit 902 is supplied to a reset terminal 'R' of the counter 901. Therefore, when the output of the counter 901 becomes equal to decimal numeral (i.e., integral number) '6', the counter 901 is reset. Thus, the counter 901 is designed to repeat outputting the integral numbers 0, 1, 2, 3, 4 and 5, each of which will be called a count number.

The NOT circuits 903 to 906 receive the bits b0 to b3 respectively. The AND circuits 910 to 915 are connected with four signal lines, respectively transmitting the bits b0 to b3 outputted from the counter 901, and other four signal lines, respectively transmitting outputs of the NOT circuits 903 to 906, through a matrix circuit as shown in FIG. 9. The matrix circuit is provided to establish certain relationship between each count number and an output of each AND circuit, as follows:

① The AND circuit 910 outputs a digit 1 only when the count number is at 0.

② The AND circuit 911 outputs a digit 1 only when the count number is at 1.

③ The AND circuit 912 outputs a digit 1 only when the count number is at 2.

④ The AND circuit 913 outputs a digit 1 only when the count number is at 3.

⑤ The AND circuit 914 outputs a digit 1 only when the count number is at 4.

⑥ The AND circuit 915 outputs a digit 1 only when the count number is at 5.

A certain part of FIG. 9 consisting of the OR circuits 921, 922 and the AND circuit 923 is provided to create the 3-bit selection control signal to the selector 608 of FIG. 6. Herein, the 3-bit selection control signal consists of first bit 'b10', second bit 'b11' and third bit 'b12' which are arranged in the binary notation from the right to the left. The OR circuit 921 inputs outputs of the AND circuits 911, 913 and 914 so as to perform a logical operation of OR on them. Result of the logical operation is outputted as the first bit b10 of the 3-bit selection control signal. The OR circuit 922 inputs outputs of the AND circuit 912, 913 and 915 so as to perform a logical operation of OR on them. Result of the logical operation is outputted as the second bit b11. The AND circuit 923 inputs the clock signal ø 3 and an output of the AND circuit 910 so as to perform a logical operation of AND on them. Result of the logical operation is outputted as the third bit b12. All of the bits b10 to b12 are assembled together to form the 3-bit selection control signal to the selector 608.

In FIG. 9, each of numbers in parentheses "[ ]" indicates the count number. Hence, each of the bits b10 to b12 is set at the digit 1 when the counter 901 outputs the count number in parentheses, as follows:

① The bit b10 is set at the digit 1 only when the count number of the counter 901 becomes equal to either 1, 3 or 4.

② The bit b11 is set at the digit 1 only when the count number becomes equal to either 2, 3 or 5.

③ The bit b12 is set at the digit 1 only when the count number is at 0 in the 'H'-level interval of the clock signal ø 3.

The output of the AND circuit 913 is used as a write-designation signal which designates a writing operation to the EQ-SR 602-1. The writing operation is designated when the write-designation signal is set at the 'H' level, while the AND circuit 913 outputs the digit 1 only when the count number is at 3. Therefore, when the count number is at 3, the writing operation is designated. Specifically, the output of the latch 631 of FIG. 6 is temporarily latched by a latch (not shown); and then, it is written into first stage of the EQ-SR 602-1 at the same timing of the write signal to the EQ-R 632.

The output of the AND circuit 910 is used as the selection control signal to the selector 634. The selection control signal is set at the digit 1 only when the count number is at 0.

The aforementioned 2-bit selection control signal to the selector 606 consists of first bit 'b20' and second bit 'b21', wherein the first bit b20 corresponds to the least significant bit and the second bit b21 corresponds to the most significant bit in the binary notation of the 2-bit selection control signal. The OR circuit 924 is provided to create the first bit b20 of the 2-bit selection control signal. The OR circuit 924 inputs the outputs of the AND circuit 910 and 913 so as to perform an logical operation of OR on them. Result of the logical operation is outputted as the first bit b20. On the other hand, a constant '0' is used as the second bit b21. The output of the AND circuit 910 is set at the digit 1 when the count number is at 0, while the output of the AND circuit 913 is set at the digit 1 when the count number is at 3. Thus, the first bit b20 is set at the digit 1 only when the count number is set at either 0 or 3.

Figure 10:
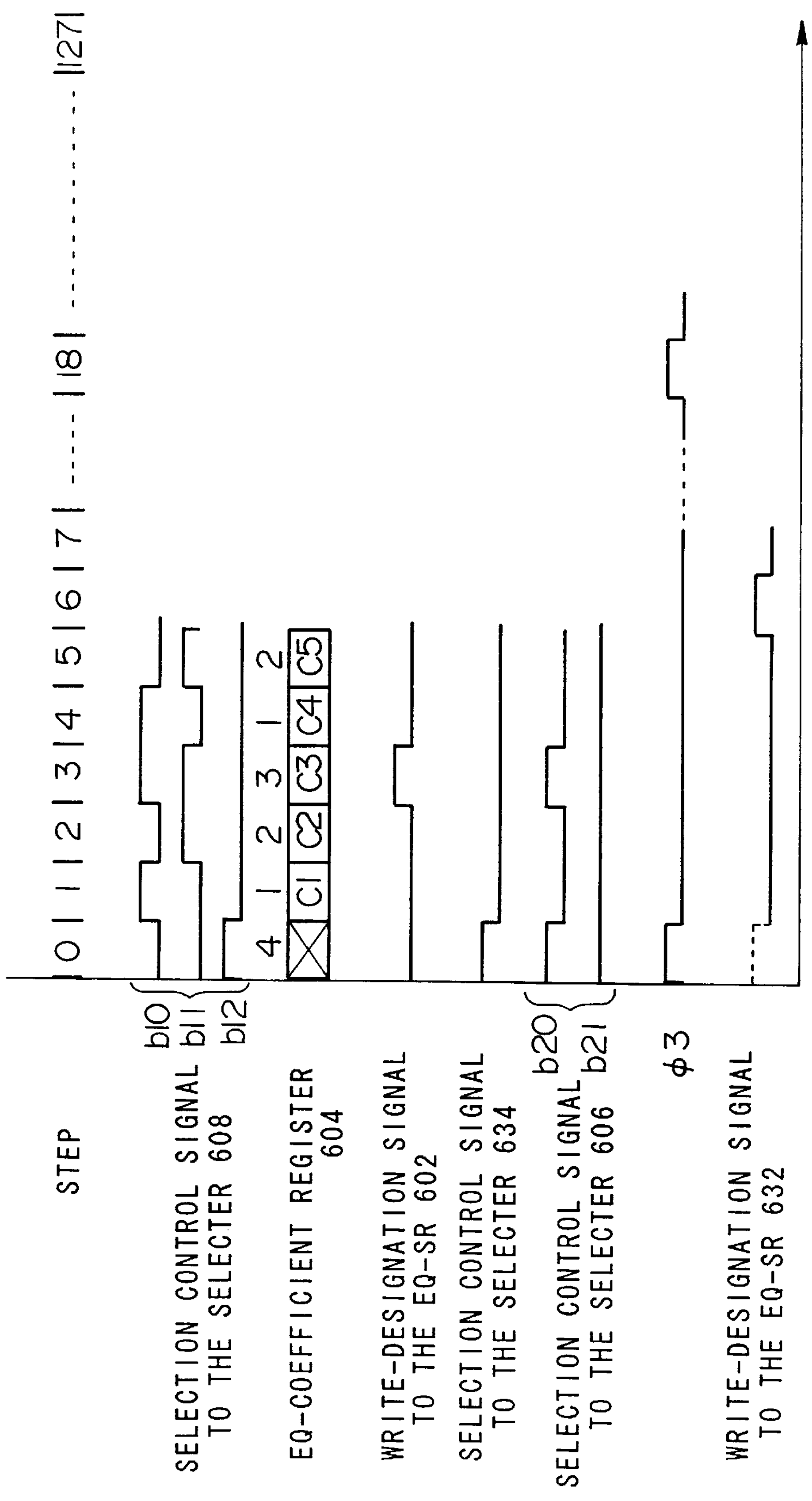
FIG. 10 is a time chart showing a variety of signals used by the DSP of FIG. 6.

FIG. 10 is a time chart showing waveforms of signals which are used by the DSP of FIG. 6 in order to realize the functions of the equalizer portion 701 of FIG. 7. Next, the operations of the DSP of FIG. 6 will be described in detail with reference to FIG. 10.

In FIG. 10, numbers "0" to "127" are written at equal intervals of distance, wherein each interval of distance accompanied by each number indicates each of the steps 0 to 127. Herein, 128 intervals of distance are shown, and they represent 128 intervals of time within one sampling period. Those steps are activated responsive to the timing signals generated by the timing signal generator 616. Each interval of FIG. 10 corresponds to the 'H'-level interval of the clock signal ø 1. Actually, however, the 'L'-level interval of the clock signal ø 1 exists at a location of a vertical line between two intervals of FIG. 10. In that 'L'-level interval, the microprogram stored by the microprogram register 117 is executed. However, in order to simplify the time chart, FIG. 10 is made by only paying attention to the 'H'-level interval of the clock signal ø 1 because FIG. 10 is provided to explain the operations realizing the functions of the equalizer portion 701. Therefore, the selectors 110, 111 and 112 of FIG. 6 normally selects the terminal 'A' in connection with the illustration of FIG. 10.

FIG. 10 shows several kinds of timing signals, generated by the timing signal generator 616 of FIG. 9, in connection with the progress of the steps. In addition to the timing signals, FIG. 10 shows the EQ-coefficient data, clock signal ø 3 and write-designation signal to the EQ-R 632 as well. The clock signal ø 3 is generated by the clock generator 625 of FIG. 6; and this signal is changed in level by every eighteen steps. In other words, the clock signal ø 3 is set at the 'H' level in step 0; and it is retained at the 'L' level in a duration between the steps 1 to 17; and then, it is set at the 'H' level in step 18. Similarly, the clock signal ø 3 is retained at the 'L' level in a duration corresponding to the steps 19 to 35; and then, it is set at the 'H' level at step 36. The write-designation signal to the EQ-R 632 is changed in level by every six steps. In FIG. 10, the write-designation signal is set at the 'H' level in steps 0 and 6. For convenience' sake, FIG. 9 omits the illustration of the write-designation signal. For example, the output of the AND circuit 910 can be used as the write-designation signal to the EQ-R 632.

Now, the operations of the equalizer portion will be described in detail in connection with the progress of the steps of FIG. 10. The counter 901, provided in the timing signal generator 616 of FIG. 9, starts counting from step 0. Specifically, the count number is at 0 in step 0; it is at 1 in step 1; it is at 2 in step 2; . . . ; and it is at 5 in step 5. Since the count number circulates in a range between 0 to 5, the count number is reset at 0 in step 6. Thereafter, the counter 901 repeats the counting described above.

In step 0, the equalizer portion, realized by the DSP, inputs data from the input register 101. The input register 101 can be configured by the shift register or the simple register. In a duration between the steps 0 to 5, the input register 101 continuously outputs the first input signal, i.e., "INPUT 1" shown in FIG. 7.

In step 0, the count number of the counter 901 is at 0, so that the integral number indicated by the 3-bit selection control signal to the selector 608 is set at 4 because as shown in FIG. 10, only the bit b12 is set at the digit 1. Therefore, the selector 608 of FIG. 6 selects the terminal '4' which receives the data (i.e., "INPUT 1") outputted from the input register 101. The data selected is then supplied to the multiplier 113 through the selector 111.

Meanwhile, the 1-bit selection control signal to the selector 634 is set at the digit 1 (see FIG. 10) in step 0, so that the selector 634 selects the terminal '1' which receives the constant '1'. This constant '1' is supplied to the multiplier 113 through the selector 112. In addition, the integral number indicated by the 2-bit selection control signal to the selector 606 is set at 1 because only the bit b21 is set at the digit 1 in step 0, so that the selector 606 selects the terminal '1' which receives the constant '0'. This constant '0' is supplied to the adder 115 through the selector 110 and the delay circuit 114 in turn.

In step 0, the arithmetic unit performs an arithmetical operation represented by an equation as follows:

$$R(0)=(\text{INPUT } 1)\times 1+0$$

Then, result of the arithmetical operation, i.e., "R(0)", is produced one step later; therefore, the result of arithmetical operation is stored by the latch 631 in the next step.

In next step 1, the count number is set at 1, so that the integral number indicated by the 3-bit selection control signal to the selector 608 is at 1 because as shown in FIG. 10, only the bit b10 is set at the digit 1. Therefore, the selector 608 selects the terminal '1' which receives the data outputted from the EQ-SR 602-1. If the last stage of the EQ-SR 602-1 stores data "$Z^{-1}$", the data $Z^{-1}$ is selected by the selector 608 and is supplied to the multiplier 113 through the selector 111.

Meanwhile, the integral number indicated by the selection control signal to the selector 634 is at 0 in step 1, so that the selector 634 selects the terminal '0' which receives the data outputted from the EQ-coefficient register 604. In step 1, the coefficient C1 is selected and is supplied to the multiplier 113 through the selector 112. In addition, the integral number indicated by the 2-bit selection control signal to the selector 606 is at 0 because both of the bits b20 and b21 are set at the same digit 0 in step 1; therefore, the selector 606 selects the terminal '0' which receives the data latched by the latch 631. That data is supplied to the adder 115 through the selector 110 and the delay circuit 114 in turn.

In step 1, the arithmetic unit performs an arithmetical operation represented by an equation as follows:

$$R(1)=Z^{-1}\times C1+(\text{DATA of LATCH } \mathbf{631})$$

Then, result of the arithmetical operation is stored by the latch 631 one step later.

In step 2, the count number is set at 2; hence, the integral number indicated by the 3-bit selection control signal to the selector 608 is at 2 because as shown in FIG. 10, only the bit b11 is set at the digit 1. Thus, the selector 608 selects the terminal '2' which receives the data outputted from the EQ-SR 602-2. If the last stage of the EQ-SR 602-2 stores data "$Z^{-2}$", the data $Z^{-2}$ is supplied to the multiplier 113 through the selector 111.

Since the integral number indicated by the selection control signal to the selector 634 is 0 in step 2, the selector 634 selects the terminal '0' which receives the data outputted from the EQ-coefficient register 604. In step 2, the coefficient C2 is selectively supplied to the multiplier 113 through the selector 112. In addition, the integral number indicated by the 2-bit selection control signal to the selector 606 is at 0 because both of the bits b20 and b21 are set at the same digit 0; and consequently, the selector 606 selects the terminal '0' which receives the data outputted from the latch 631. That data selected is supplied to the adder 115 through the selector 110 and the delay circuit 114 in turn.

In step 2, the arithmetic unit performs an arithmetical operation represented by an equation as follows:

$$R(2)=Z^{-2}\times C2+(\text{DATA of LATCH } \mathbf{631})$$

Then, result of the arithmetical operation is stored by the latch 631 one step later.

In step 3, the count number is set at 3, so that the integral number indicated by the 3-bit selection control signal to the selector 608 is at 3 because as shown in FIG. 10, two bits b10 and b11 are set at the same digit 1 but the bit b12 is set at the digit 0. Therefore, the selector 608 selects the terminal '3' which receives the data outputted from the latch 631. That data selected is supplied to the multiplier 113 through the selector 111.

Meanwhile, the integral number indicated by the selection control signal to the selector 634 is at 0 in step 3; and consequently, the selector 634 selects the terminal '0' which receives the data outputted from the EQ-coefficient register 604. In step 3, the coefficient C3 is selectively supplied to the multiplier 113 through the selector 112. In addition, the integral number indicated by the 2-bit selection control signal to the selector 606 is at 1 because only the bit b20 is set at the digit 1; and consequently, the selector 606 selects the terminal '1' which receives the constant '0'. Thus, the constant '0' is selectively supplied to the adder 115 through the selector 110.

In step 3, the arithmetic unit performs an arithmetical operation represented by an equation as follows:

$$R(3)=(\text{DATA of LATCH } \mathbf{631})\times C3+0$$

Then, result of the arithmetical operation is stored by the latch 631 one step later.

In the step 3, the latch (not shown) latches the result of arithmetical operation "R(2)" of the step 2. The data latched is written into first stage of the EQ-SR 602-1 at the same timing (i.e., each of start timings of the steps 0, 6, 12, . . . ) of the write signal to the EQ-R 632. At the same time, data of the EQ-SR 602-1 and EQ-SR 602-2 are shifted. Since each of the EQ-SR 602-1 and EQ-SR 602-2 is configured by the shift register of twelve words, if the data of the shift register is successively shifted by the above-mentioned timing, in a duration corresponding to the steps 0 to 5 in which the equalizer EQ1 performs computing, the EQ-SR 602-1 continuously outputs the data $Z^{-1}$ which is delayed by one sampling period, while the EQ-SR 602-2 continuously outputs the data $Z^{-2}$ which is delayed by two sampling periods. The same operations are repeated.

In step 4, the count number is set at 4, so that the integral number indicated by the 3-bit selection control signal to the selector 608 is at 1 because as shown in FIG. 10, only the bit 10 is set at the digit 1. Therefore, the selector 608 selects the terminal '1' which receives the data outputted from the EQ-SR 602-1. Thus, the data $Z^{-1}$, which is retained at the last stage of the EQ-SR 602-1, is selected. The data $Z^{-1}$ selected is supplied to the multiplier 113 through the selector 111.

Meanwhile, the integral number indicated by the selection control signal to the selector 634 is at 0 in step 4. Therefore, the selector 634 selects the terminal '0' which receives the data outputted from the EQ-coefficient register 604. Herein, the coefficient C4 is selectively supplied to the multiplier 113 through the selector 112. In addition, the integral number indicated by the 2-bit selection control signal to the selector 606 is at 0 because both of the bits b20 and b21 are set at the same digit 0 in step 4; hence, the selector 606 selects the terminal '0' which receives the data outputted from the latch 631. That data selected is supplied to the adder 115 through the selector 110 and the delay circuit 114 in turn.

In step 4, the arithmetic unit performs an arithmetical operation represented by an equation as follows:

$$R(4)=Z^{-1}\times C4+(\text{DATA of LATCH } \mathbf{631})$$

Then, result of the arithmetical operation is stored by the latch 631 one step later.

In step 5, the count number is set at 5, so that the integral number indicated by the 3-bit selection control signal to the selector 608 is at 2 because only the bit b11 is set at the digit 1. Therefore, the selector 608 selects the terminal '2' which receives the data $Z^{-2}$ retained at the last stage of the EQ-SR 602-2. The data $Z^{-2}$ selected is supplied to the multiplier 113 through the selector 111.

Meanwhile, the integral number indicated by the selection control signal to the selector 634 is set at 0 in step 5. Hence, the selector 634 selects the terminal '0' which receives the data outputted from the EQ-coefficient register 604. Herein, the coefficient C5 is selectively supplied to the multiplier 113 through the selector 112. In addition, the integral number indicated by the 2-bit selection control signal to the selector 606 is at 0 because both of the bits b20 and b21 (see FIG. 10) are set at the same digit 0. Hence, the selector 606 selects the terminal '0' which receives the data outputted from the latch 631. That data selected is supplied to the adder 115 through the selector 110 and the delay circuit 114 in turn.

In step 5, the arithmetic unit performs an arithmetical operation represented by an equation as follows:

$$R(5)=Z^{-2}\times C5+(\text{DATA of LATCH } 631)$$

Then, result of the arithmetical operation is stored by the latch 631 one step later.

In step 6, the write-designation signal to the EQ-R 632 is set at the 'H' level as shown in FIG. 10. Thus, the result of arithmetical operation, i.e., "R(5)", which is obtained in the step 5 is stored by the EQ-R 632.

The above-mentioned operations performed in the step 0 to step 6 are required to complete the processing of the equalizer EQ1 (see FIG. 8) within the equalizer portion 701 of FIG. 7. Thereafter, operations of the step 6 and its consecutive steps are required to perform the processing of the equalizer EQ2 which is similar to the aforementioned operations of the step 0 and its consecutive steps. Different from the step 0, the clock signal ø 3 is set at the 'L' level in step 6. Therefore, the integral number indicated by the 3-bit selection control signal to the selector 608 is at 0. Hence, the selector 608 selects the terminal '0' which receives the data outputted from the EQ-R 632. Thus, in step 6, the arithmetic unit performs an arithmetical operation represented by an equation as follows:

$$R(6)=(\text{DATA of EQ-R } \mathbf{632})\times 1+0$$

Then, result of the arithmetical operation is stored by the latch 631.

As described above, the processing of the equalizer EQ2 is performed in steps 6 to 12; and then, the processing of the equalizer EQ3 is performed in steps 12 to 18. An output of the equalizer EQ3 is stored in a certain area of the data register 103. As shown in FIG. 10, the clock signal ø 3 is set at the 'H' level in step 18. This is because steps 18 to 35 are used to perform the processing of the steps 0 to 17 with respect to the second input signal "INPUT 2" of FIG. 7. Similarly, steps 36 to 53 are used to perform the processing with respect to "INPUT 3"; and steps 54 to 72 are used to perform the processing with respect to "INPUT 4". Results of the processing are inputted to the effect portion 702 through the data register 103.

According to the second embodiment described heretofore, the equalization processing and effect-imparting processing are alternatively performed in response to the clock signals ø 1 and ø 2. Therefore, the second embodiment is advantageous because it is possible not to consider about the timings to yield the results of the arithmetical operations performed by the microprogram realizing the effect-imparting processing.

Incidentally, each of the first and second embodiment is designed to change over two series of processing (i.e., two series of microprograms). However, the number of the microprograms which are alternatively executed is not specifically limited by the present invention. Hence, it is possible to modify the first embodiment such that three microprograms or more are sequentially changed over.

Lastly, the elements of the DSP and the arrangement thereof shown by the drawings can be modified within the scope of the invention.

As this invention may be embodied in several forms without departing from the spirit of essential characteristics thereof, the present embodiments are therefore illustrative and not restrictive, since the scope of the invention is defined by the appended claims rather than by the description preceeding them, and all changes that fall within meets and bounds of the claims, or equivalence of such meets and bounds are therefore intended to be embraced by the claims.

What is claimed is:

1. A digital signal processing device comprising:

storage means for storing a plurality of microprograms each consisting of a plurality of microinstructions, each of the microprograms including microinstructions for performing an effect imparting calculation, and at least one of the microprograms including microinstructions for performing a line connection calculation between said effect-imparting calculations;

read-out means for reading out the microinstructions, respectively belonging to said plurality of microprograms, in turn in accordance with a predetermined sequence; and signal processing means for inputting a digital signal during each sampling cycle, and executing digital signal processing upon the inputted signal in accordance with the microinstructions read by the read-out means, and outputting a signal during each sampling cycle to which is imparted a multi-effect corresponding to plural effects of said effect-imparting calculation connected by said line connection calculation.

2. A digital signal processing device comprising:

program supply means for supplying at least two kinds of programs, each consisting of a plurality of steps, alternatively, each of the microprograms including microinstructions for performing an effect-imparting calculation, and at least one of the microprograms including microinstructions for performing a line connection calculation between said effect-imparting calculations;

computing means for performing digital computing, using data supplied thereto, in accordance with the at least two kinds of program;

data storing means for storing the data supplied or results of the digital computing performed by the computing means; and control means for controlling operations of the data storing means with the control means being instructed by both of the at least two kinds of programs.

3. The digital signal processing device of claim 2, further comprising:

distortion imparting means for running a first one of said microprograms associated with first coefficient data and first address data to impart distortion to input musical tone data supplied thereto;

reverberation imparting means for running a second one of said microprograms, associated with second coefficient data and second address data to impart reverberation to input musical tone data supplied thereto;

execution control means for controlling a combined execution of the distortion imparting means and reverberation imparting means; and calculation means for performing calculations based upon the input musical tone data, an output of the distortion imparting means and an output of the reverberation imparting means so as to provide output data representing musical tone to which effects are imparted.

4. The digital signal processing device, as recited in claim 3, wherein the execution control means realizes a serial connection between the distortion imparting means and the reverberation imparting means.

5. The digital signal processing device, as recited in claim 3, wherein the execution control means realizes a parallel connection between the distortion imparting means and the reverberation imparting means.

6. A digital signal processing device comprising:

input means for inputting first data supplied thereto during each sampling cycle;

microprogram storing means for storing first and second microprograms, each consisting of a plurality of microinstructions for performing an effect imparting calculation;

selecting means for automatically selecting one of the first and second microprograms in accordance with a preset sequence of processing;

arithmetic means for performing arithmetical operations in accordance with the microprogram selected by the selecting means;

storage means for storing second data representative of results of the arithmetical operations which have been performed during each sampling cycle by the arithmetic means;

output means for outputting third data representative of result of the arithmetical operations of the second microprogram during each sampling cycle; and data supply means for when the first microprogram is selected, supplying the first data to the arithmetic means so that the arithmetic means performs the arithmetical operations using the first data and for when the second microprogram is selected, supplying the second data stored during a preceding sampling cycle to the arithmetic means so that the arithmetic means performs the arithmetical operations using the second data.

7. A digital signal processing device according to claim 6 wherein the first microprogram is designed to impart distortion to the first data, while the second microprogram is designed to impart reverberation to the second data.

8. A digital signal processing device according to claim 6 wherein the arithmetic means performs multiplication and addition.

* * * * *